(12) United States Patent
Song et al.

(10) Patent No.: US 12,543,984 B2
(45) Date of Patent: Feb. 10, 2026

(54) DEVICE AND METHOD FOR MONITORING BRAIN-OBJECT INTERACTIONS IN COMMUNITY, RECORDING MEDIUM FOR PERFORMING THE METHOD

(71) Applicant: KOREA INSTITUTE OF SCIENCE AND TECHNOLOGY, Seoul (KR)

(72) Inventors: Jin-Dong Song, Seoul (KR); Jee Hyun Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 407 days.

(21) Appl. No.: 18/191,572

(22) Filed: Mar. 28, 2023

(65) Prior Publication Data

US 2023/0404453 A1    Dec. 21, 2023

(30) Foreign Application Priority Data

Jun. 16, 2022  (KR) ........................ 10-2022-0073663

(51) Int. Cl.
*A61B 5/00* (2006.01)
*A61B 5/16* (2006.01)
(Continued)

(52) U.S. Cl.
CPC ............ *A61B 5/165* (2013.01); *A61B 5/0006* (2013.01); *A61B 5/0017* (2013.01); *A61B 5/372* (2021.01);
(Continued)

(58) Field of Classification Search
CPC ..... A61B 5/165; A61B 5/0006; A61B 5/0017; A61B 5/372; A61B 5/377;
(Continued)

(56) References Cited

U.S. PATENT DOCUMENTS 11,301,044 B1 *   4/2022   Chevillet ............... G06N 20/00
11,317,869 B2 *   5/2022   Aeschlimann .... A61M 37/0015
(Continued)

FOREIGN PATENT DOCUMENTS

EP            2 959 665 B1    7/2020
KR      10-2016-0064491 A    6/2016
(Continued)

OTHER PUBLICATIONS

Korean Office Action issued on Oct. 28, 2024, in corresponding Korean Patent Application No. 10-2022-0073663. (23 pages in English and 16 pages in Korean).

*Primary Examiner* — May A Abouelela
(74) *Attorney, Agent, or Firm* — NSIP Law

(57) ABSTRACT

A device for monitoring brain-object interactions in a community includes a probe module attached to each individual and including a stimulation device, a specific wavelength emitting device, an infrared (IR) receiving device and a recording memory; a central controller to regulate a connection between the probe module and at least one object to control and monitor the probe module or the object; a plurality of IR emitters to transmit a time sync signal and a command to the probe module to monitor the individual; and a plurality of specific wavelength receivers to transmit the electrical signal received by the probe module to the central controller. Accordingly, it is possible to integratedly control the connection between the probe module and the object through the central controller and prevent confusion and loss of data transmission, thereby achieving efficient monitoring of the community.

17 Claims, 9 Drawing Sheets

(51) Int. Cl.
*A61B 5/372* (2021.01)
*A61B 5/377* (2021.01)

(52) U.S. Cl.
CPC ...... *A61B 5/377* (2021.01); *A61B 2560/0431* (2013.01)

(58) Field of Classification Search
CPC . A61B 2560/0431; A61B 5/24; A61B 5/4064; A61B 5/6868; A61B 5/369; A61B 5/384; G16H 50/20
See application file for complete search history.

(56) References Cited

U.S. PATENT DOCUMENTS

| | | | | |
|---|---|---|---|---|
| 2006/0049957 | A1* | 3/2006 | Surgenor | A61B 5/293 340/4.1 |
| 2008/0262335 | A1* | 10/2008 | Sun | A61N 1/0472 600/386 |
| 2010/0324440 | A1* | 12/2010 | Moore | A61B 5/377 600/544 |
| 2013/0150684 | A1* | 6/2013 | Cooner | A61B 5/4082 600/595 |
| 2015/0313496 | A1* | 11/2015 | Connor | A61B 5/369 600/301 |
| 2016/0262608 | A1* | 9/2016 | Krueger | G16H 40/63 |
| 2017/0319116 | A1* | 11/2017 | Chang | A61B 5/0059 |
| 2018/0184974 | A1* | 7/2018 | Cimenser | A61B 5/38 |
| 2019/0159675 | A1* | 5/2019 | Sengupta | A61B 5/7435 |
| 2019/0262612 | A1* | 8/2019 | Rao | A61B 5/11 |
| 2019/0365263 | A1* | 12/2019 | Raj | A61B 5/0024 |
| 2020/0054267 | A1* | 2/2020 | Srinivasan | A61B 5/0261 |
| 2020/0107725 | A1* | 4/2020 | Tyler | A61B 8/485 |
| 2020/0205699 | A1* | 7/2020 | Mckay | A61B 5/38 |
| 2020/0272242 | A1* | 8/2020 | Yoshida | G06F 3/023 |
| 2020/0375530 | A1* | 12/2020 | Kabrams | A61N 7/00 |
| 2020/0383621 | A1* | 12/2020 | Cuestas Rodriguez | A61B 5/11 |
| 2021/0169417 | A1* | 6/2021 | Burton | A61B 5/4857 |
| 2021/0228118 | A1* | 7/2021 | Friesen | A61B 5/0075 |
| 2021/0330266 | A1* | 10/2021 | Rojkova | A61B 5/7246 |
| 2021/0353219 | A1* | 11/2021 | Narayanan | A61B 5/4809 |
| 2022/0079505 | A1 | 3/2022 | Choi et al. | |
| 2022/0322986 | A1* | 10/2022 | Iliev | A61B 5/02055 |
| 2023/0022546 | A1* | 1/2023 | Malchano | A61B 5/372 |
| 2023/0118151 | A1* | 4/2023 | Kayama | A61B 5/374 |
| 2023/0161411 | A1* | 5/2023 | Takatsuka | A61B 5/6815 345/156 |
| 2023/0346275 | A1* | 11/2023 | Mizumoto | G06Q 30/0201 |
| 2023/0368887 | A1* | 11/2023 | Roh | G16H 40/67 |
| 2023/0380739 | A1* | 11/2023 | Ihlefeld | A61B 5/7225 |
| 2023/0389798 | A1* | 12/2023 | Zheng | A61B 5/0035 |
| 2024/0237932 | A1* | 7/2024 | Furuta | A61B 5/165 |

FOREIGN PATENT DOCUMENTS

| | | |
|---|---|---|
| KR | 10-1737930 B1 | 5/2017 |
| KR | 10-1919907 B1 | 11/2018 |
| KR | 10-2020-0077883 A | 7/2020 |
| KR | 10-2021-0103036 A | 8/2021 |
| KR | 10-2022-0036730 A | 3/2022 |
| KR | 10-2385869 B1 | 4/2022 |

* cited by examiner

DEVICE AND METHOD FOR MONITORING BRAIN-OBJECT INTERACTIONS IN COMMUNITY, RECORDING MEDIUM FOR PERFORMING THE METHOD

CROSS-REFERENCE TO RELATED APPLICATIONS

This application claims priority to Korean Patent Application No 10-2022-0073663, filed on Jun. 16, 2022, and all the benefits accruing therefrom under 35 U.S.C. § 119, the contents of which in its entirety are herein incorporated by reference for all purposes.

BACKGROUND

1. Field

The present disclosure relates to a device and method for monitoring brain-object interactions in a community and a recording medium for performing the method, and more particularly, to technology that efficiently transmits data and controls the data transmission by optically connecting all probe modules through infrared emitters and specific wavelength receivers controlled and monitored by a central controller connected to a computer.

2. Description of the Related Art

One of the long-standing challenges in neuroscience and social science is to understand neural mechanisms which are the basis of complex social collective behaviors.

Such study needs neural processing, but there is a lot of lack of integrated solutions for connecting brain activities to specific social behaviors.

According to earlier studies, in the general evolutionary context, individual behaviors in groups are explained as behaviors of individuals in groups found within the frame such as collective motion (for example, migration, defensive solidarity, synchronized reproduction), regional behavior (for example, competition, breeding, parenting), population size structure (for example, hierarchy) or the like.

The collective behaviors are not simply the sum of behaviors of each individual, but comparative measurement and analysis of brain levels of individuals is necessary to study the neural mechanisms of social behaviors.

This approach emphasizes causal relationships between neural elements and social behaviors, but collective behaviors manifested by communications and interactions between individuals are very difficult to infer from the knowledge of their elements.

Further, many global attributes of the social group are the outcomes of controlled interactions between group members, and the statistical outcomes of single brain studies are insufficient to find the characteristics of social interactions.

On the other hand, it has been reported that along with behavior levels, brain regions and neural circuits rely on the social context of interactions between two or more individuals. It is because most of behaviors are the outcomes of intuitive interactions between group members.

Accordingly, to explain complex social behaviors more satisfactorily based on neurodynamics, direct observation of brain and behavior is necessary, and to study social behaviors, it is necessary to simultaneously observe brain activities of multiple individuals. That is, it is necessary to independently designate brain activity of each individual and simultaneously observe it in a group.

However, since the current simple 1:1 extension system sends a large amount of information, it suffers confusion between each probe board and information loss. Specifically, there are risks of the loss of records by line errors in multi-communication and time mismatch between the probe boards. Additionally, it is difficult to mount a plurality of functions and install a feedback circuit in the limited probe board due to the power, space and time.

SUMMARY

The present disclosure is designed to address this issue and therefore the present disclosure is directed to providing a device for monitoring brain-object interactions in a community.

The present disclosure is further directed to providing a method for monitoring brain-object interactions in a community.

The present disclosure is further directed to providing a recording medium having recorded thereon a computer program for performing the method for monitoring brain-object interactions in a community.

To achieve the above-described objective of the present disclosure, a device for monitoring brain-object interactions in a community according to an embodiment includes a probe module attached to each individual in the community, and including a stimulation device to stimulate the individual, a specific wavelength emitting device, an infrared (IR) receiving device and a recording memory to store a brain's electrical signal measured from the individual; a central controller to regulate a connection between the probe module and at least one object to control and monitor the probe module or the object, wherein the object monitors a surrounding environment of the community and applies external stimulation to the individual; a plurality of IR emitters to transmit a time sync signal and a command to the probe module to monitor the individual in the community, the IR emitters being controlled by the central controller; and a plurality of specific wavelength receivers to transmit the electrical signal received by the probe module to the central controller, the specific wavelength receivers being controlled by the central controller.

In an embodiment of the present disclosure, the probe module may further include a program or circuit to interpret the brain's electrical signal, and store and transmit an interpretation outcome of the brain's electrical signal to the central controller.

In an embodiment of the present disclosure, the program or circuit may include a signal detection unit to detect and process the brain's electrical signal received by the IR receiving device; a stimulation determination unit to determine a presence or absence of a stimulation command from the processed brain's electrical signal; a sync determination unit to determine a presence or absence of a time sync signal from the processed brain's electrical signal; a stimulation transmission unit to transmit the determined stimulation command and the determined time sync signal to the stimulation device; and an event transmission unit to periodically store the brain's electrical signal related to a specific event in the recording memory, or transmit it to the central controller through the specific wavelength emitting device.

In an embodiment of the present disclosure, the central controller may include a signal processing unit to process the brain's electrical signal received from the probe module through the specific wavelength receiver; a stimulation command generation unit to determine a stimulation command part from the processed brain's electrical signal, and generate, execute and transmit a stimulation command to the IR emitter; a measurement condition change command generation unit to determine a measurement condition change part from the processed brain's electrical signal, and generate, execute and transmit a measurement condition change command to the IR emitter; and a sync signal generation unit to determine a time sync signal part from the processed brain's electrical signal, and generate, execute and transmit a sync signal to the IR emitter.

In an embodiment of the present disclosure, the central controller may control and store a relationship between the individual and the community by the environment or stimulation through the measured brain's electrical signal and the object.

In an embodiment of the present disclosure, in a case in which the plurality of specific wavelength receivers receives the brain's electrical signal from one probe module, the central controller may use the signal of the specific wavelength receiver having received the highest intensity signal.

In an embodiment of the present disclosure, the stimulation device may include at least one of an electrical stimulation device, an optical stimulation device or a chemical stimulation device.

In an embodiment of the present disclosure, the probe module may command the stimulation device to apply direct or autonomous stimulation according to the command from the central controller.

In an embodiment of the present disclosure, the object may be a device that measures an environment of an experimental space in which the community is present or a device that changes the environment.

In an embodiment of the present disclosure, each probe module may be allocated with a unique ID or address to communicate with the central controller.

In an embodiment of the present disclosure, the probe module and the central controller may further use at least one wireless communication of ultrasonic waves, Bluetooth, WiFi, NFC, WPAN or Zigbee.

To achieve the above-described other objective of the present disclosure, a method for monitoring brain-object interactions in a community, by a probe module attached to each individual in the community, and including a stimulation device to stimulate the individual, a specific wavelength emitting device, an IR receiving device and a recording memory to store a brain's electrical signal measured from the individual and a central controller to regulate a connection between the probe module and at least one object to control and monitor the probe module or the object, wherein the object monitors a surrounding environment of the community and applies external stimulation to the individual according to an embodiment, includes transmitting a time sync signal and a command to the probe module to monitor the individual in the community through a plurality of IR emitters; controlling a device that measures an environment of an experimental space in which the community is present or the object that changes the environment; receiving the electrical signal from the probe module by a plurality of specific wavelength receivers; and monitoring and controlling a relationship between the individual and the community by the environment or stimulation through the measured brain's electrical signal and the object.

In an embodiment of the present disclosure, the electrical signal received from the probe module may be an outcome of interpretation by a program or circuit to interpret the brain's electrical signal, embedded in the probe module.

In an embodiment of the present disclosure, the monitoring and controlling of the relationship between the individual and the community by the environment or stimulation through the measured brain's electrical signal and the object may include processing the brain's electrical signal received from the probe module through the specific wavelength receiver; determining a stimulation command part from the processed brain's electrical signal, and generating, executing and transmitting a stimulation command to the IR emitter; determining a measurement condition change part from the processed brain's electrical signal, and generating, executing and transmitting a measurement condition change command to the IR emitter; and determining a time sync signal part from the processed brain's electrical signal, and generating, executing and transmitting a sync signal to the IR emitter.

In an embodiment of the present disclosure, the method for monitoring brain-object interactions in a community may further include storing the relationship between the individual and the community by the environment or stimulation through the measured brain's electrical signal and the object.

In an embodiment of the present disclosure, the receiving of the electrical signal from the probe module may include using the signal of the specific wavelength receiver having received the highest intensity signal, in a case in which the plurality of specific wavelength receivers receives the brain's electrical signal from one probe module.

To achieve another objective of the present disclosure, a computer-readable storage medium according to an embodiment has recorded thereon a computer program for performing the method for monitoring brain-object interactions in a community.

According to the device for monitoring brain-object interactions in a community, the central controller optically connects the respective probe modules to the respective objects, and regulates and integratedly controls the connections between the probe modules and the objects (for example, surrounding environment, stimulation, etc.).

Additionally, the electrical signal measured from each individual is stored in the recording memory included or embedded in the probe module, and only the outcome of interpretation using the program or circuit that interprets the brain's electrical signal is transmitted to the central controller.

Accordingly, only minimum information is communicated between each probe module and the central controller (command, condition display, etc.), thereby reducing information loss of the probe module and preventing confusion and loss between each probe module.

DETAILED DESCRIPTION

Figure 1:
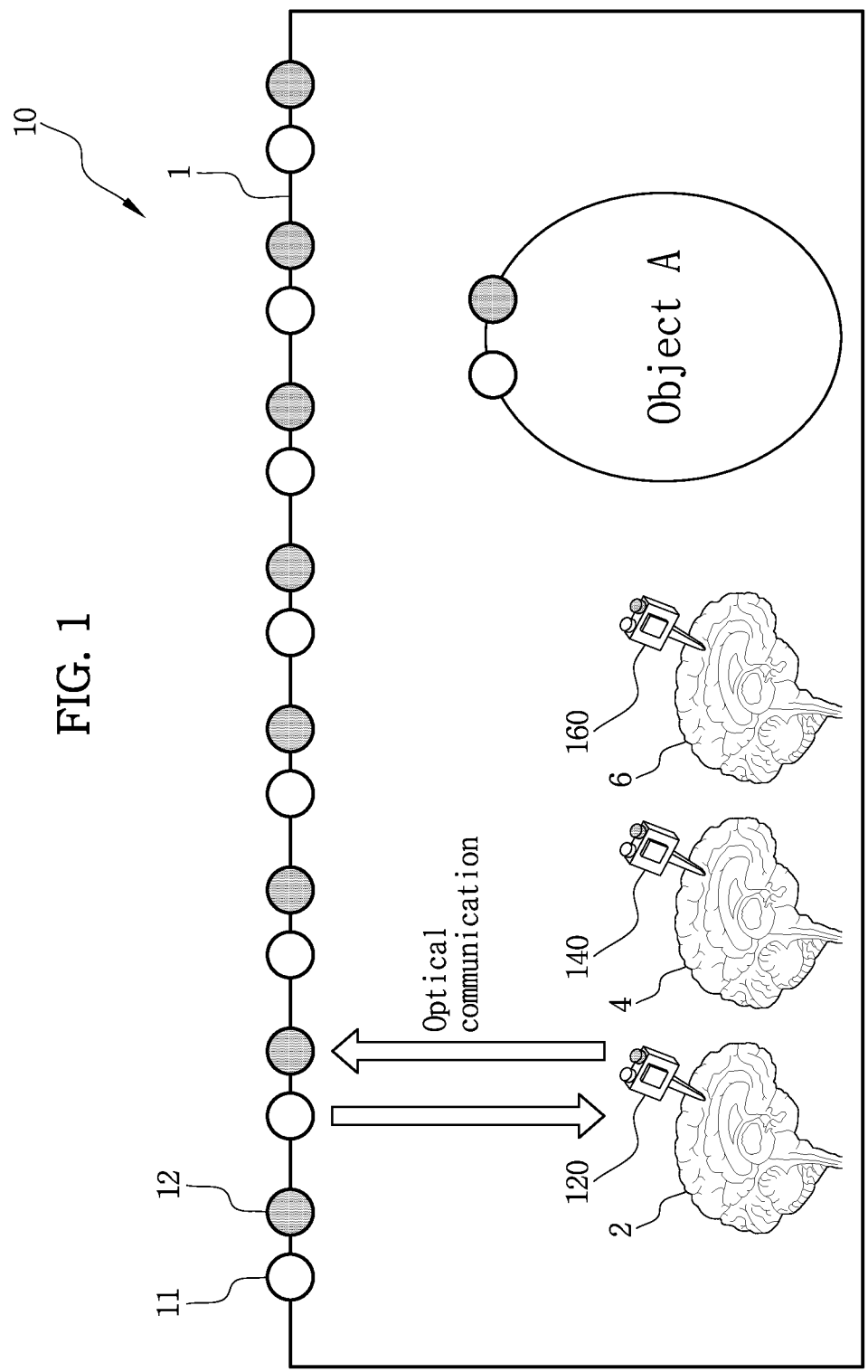
FIG. 1 is a conceptual diagram of a device for monitoring brain-object interactions in a community according to the present disclosure.

The following detailed description of the present disclosure is made with reference to the accompanying drawings showing exemplarily particular embodiments for practicing the present disclosure. These embodiments are described in sufficient detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs indicate same or similar functions in many aspects.

Hereinafter, exemplary embodiments of the present disclosure will be described in more detail with reference to the accompanying drawings.

Figure 2:
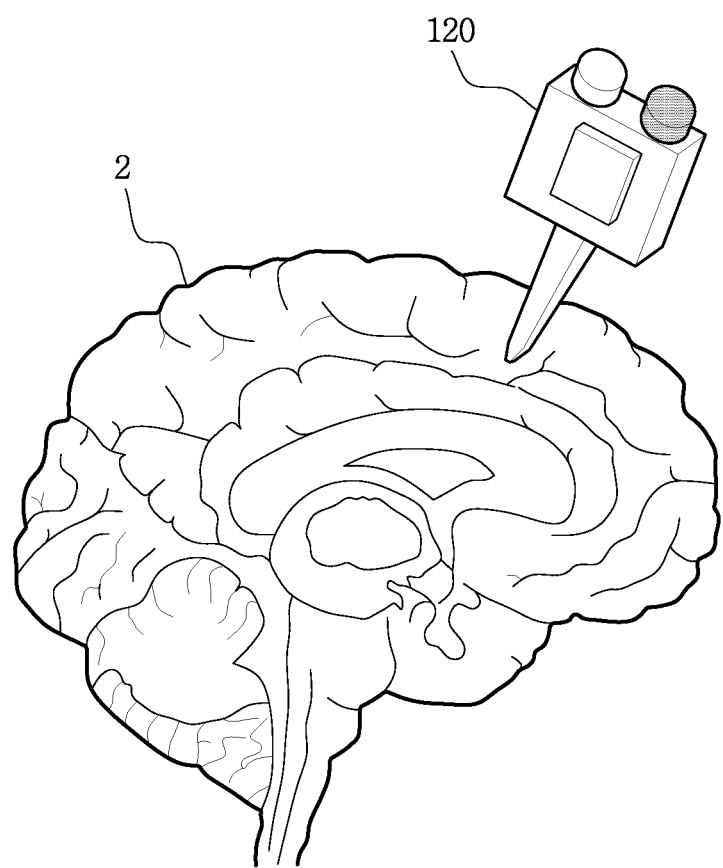
FIG. 2 is a diagram showing an example of a probe module attached to an individual of FIG. 1.

FIG. 1 is a conceptual diagram of a device for monitoring brain-object interactions in a community according to the present disclosure. FIG. 2 is a diagram showing an example of a probe module attached to an individual of FIG. 1.

The device 10 for monitoring brain-object interactions in a community according to the present disclosure may be controlled by a central controller (not shown) in a predefined experimental space 1 in which the community is present.

Referring to FIG. 1, the device 10 according to the present disclosure includes the central controller (not shown), probe modules 120, 140, 160 attached to each individual 2, 4, 6 in the community, at least one object A, a plurality of infrared (IR) emitters 11 and a plurality of specific wavelength receivers 12.

The central controller (not shown) may be connected to an external computer to connect and control the probe modules 120, 140, 160, the at least one object A, the plurality of IR emitters 11 and the plurality of specific wavelength receivers 12 via optical communication.

In this instance, the used wavelength may be the wavelength in the IR range that is invisible to mice or experimental animals. Additionally, it may be adjusted to a predetermined frequency to reduce the influence of noise on communication.

The central controller (not shown) of the present disclosure may have software (application) for monitoring brain-object interactions in a community installed therein and run it, and may be controlled by the software for monitoring brain-object interactions in a community.

The central controller (not shown) of the present disclosure may operate the plurality of IR emitters 11 at the same time. To this end, the central controller may transmit a time sync signal and a command to the probe modules 120, 140, 160 through the plurality of IR emitters 11 to monitor the individuals 2, 4, 6 in the community.

The plurality of IR emitters 11 may include any type of light emitting device, for example, a light-emitting diode (LED), and may be arranged to affect all the individuals present in the experimental space 1. The arrangement and number of the IR emitters 11 may change depending on the user's needs.

The plurality of specific wavelength receivers 12 transmits electrical signals received by the probe modules 120, 140, 160 to the central controller (not shown). In the case that the plurality of specific wavelength receivers 12 receives the electrical signals received by the probe modules 120, 140, 160, the central controller (not shown) may use the signal of the specific wavelength receiver 12 having received the highest intensity signal.

The plurality of specific wavelength receivers 12 may be also controlled by the central controller (not shown), and the number of specific wavelength receivers 12 may correspond to the number of IR emitters 11, but is not limited thereto. For example, the plurality of specific wavelength receivers 12 may be cameras.

The at least one object A plays a role in monitoring the surrounding environment of the community and applying external stimulation to the individual. In an embodiment, the object may be a device that measures the environment of the experimental space in which the community is present (temperature, humidity, smell, etc.) or a device that changes the environment (temperature, humidity, feeding, electrical stimulation, chemical stimulation, etc.).

Although FIG. 1 shows only one object A, the user may add object B, object C or the like or change the object A to object B, object C or the like to provide different experimental conditions.

The central controller (not shown) may control and record a relationship between the environment and the stimulation through the measured brain's electrical signal and the object.

Referring to FIG. 2, the probe modules 120, 140, 160 are respectively attached to or partially inserted into the individuals 2, 4, 6 in the community to sense the brain's electrical signal from the corresponding individuals 2, 4, 6.

Each probe module 120, 140, 160 may perform analog signal sensing or digital signal sensing, and for example, may generate and store a time-stamp in memory.

Each probe module 120, 140, 160 may measure the brain's electrical signal from each individual 2, 4, 6, and store it in the internal high capacity memory without loss or after proper signal processing.

Each probe module 120, 140, 160 may be allocated with a unique ID or address to communicate with the central controller (not shown). Through this, it is possible to prevent confusion in communication between the probe modules 120, 140, 160, and the central controller (not shown) may identify the individual that has sent a signal through the unique ID.

In this embodiment, the individuals 2, 4, 6 may be the measurement targets in the community to test. Although FIG. 1 shows three individuals 2, 4, 6 and three probe modules 120, 140, 160, each corresponding to each individual, this is shown for convenience, and a larger number of individuals may be included.

Hereinafter, the probe module 120 attached to the individual 2 of FIG. 2 will be representatively described.

Figure 3:
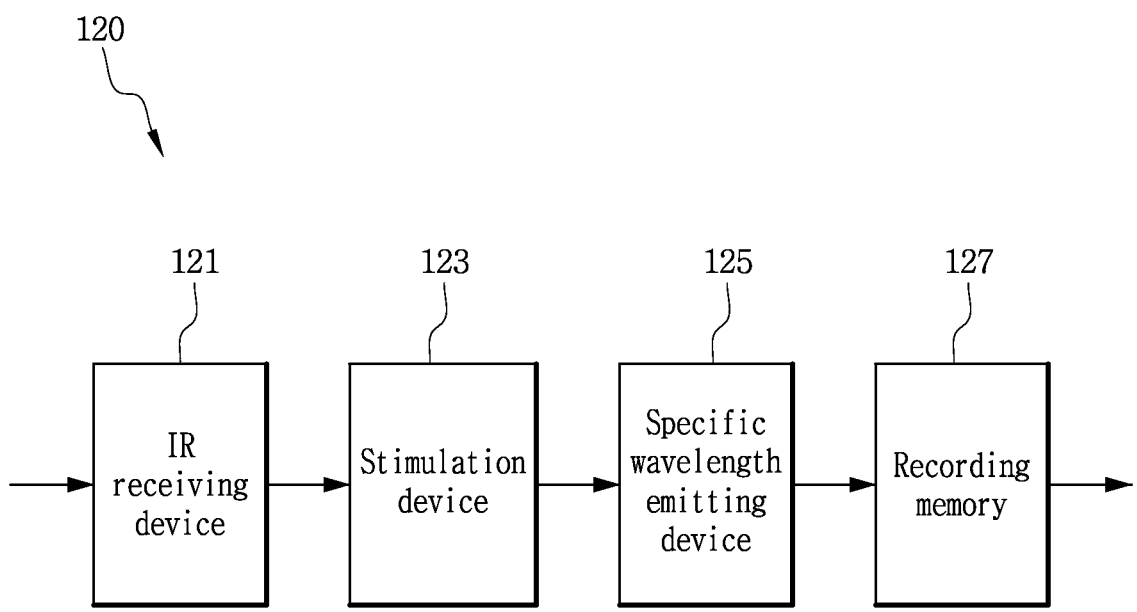
FIG. 3 is a block diagram of a probe module according to an embodiment of the present disclosure.

Referring to FIG. 3, the probe module 120 may include an IR receiving device 121, a stimulation device 123 to stimulate the individual 2, a specific wavelength emitting device 125 and a recording memory 127 to store the measured brain's electrical signal.

For example, the probe module 120 may select an analysis algorithm according to the command of the central controller, and analyze a brainwave signal during operation. In this case, a plurality of algorithms (for example, a mouse is sleeping, gets angry, feels sleepy, feels scared, etc.) may be embedded and used to analyze the brainwave signal.

The probe module 120 of the present disclosure may have software (application) installed therein and run it, and the IR receiving device 121, the stimulation device 123, the specific wavelength emitting device 125 and the recording memory 127 may be controlled by the software for monitoring brain-object interactions in a community, running in the probe module 120.

The probe module 120 may be a terminal or a module of the terminal. Additionally, the IR receiving device 121, the stimulation device 123, the specific wavelength emitting device 125 and the recording memory 127 may be incorporated into an integrated module or may be formed as one or more modules. However, on the contrary, each component may be a separate module.

The IR receiving device 121 receives light from the plurality of IR emitters 11, and transmits it to the stimulation device 123. In other words, the IR receiving device 121 receives the time sync signal and the command through the plurality of IR emitters 11, and in response, stimulates the individual 2.

The stimulation device 123 may be an electrical stimulation device, an optical stimulation device and a chemical stimulation device, but is not limited thereto, and includes any type of device that can apply stimulation to the individual.

The specific wavelength emitting device 125 may transmit the brain's electrical signal measured from the individual to the central controller (not shown) through the plurality of specific wavelength receivers 12.

Additionally, in the present disclosure, the probe module 120 does not transmit all the data sensed from the individual 2 directly to the central controller (not shown), and stores all the sensed data in the recording memory 127.

Each probe module 120, 140, 160 may inform the central controller of information interpreted using a variety of pre-stored interpretation programs according to the command selected by the central controller (or by the selection of the pre-stored program). Additionally, the interpretation outcome may be displayed through a display device such as a monitor.

The central controller may command to apply prompt stimulation directly (simultaneously, if necessary) to each probe module 120, 140, 160, and may command to allow each probe module 120, 140, 160 to autonomously apply stimulation using the outcome of the interpretation program in each probe module 120, 140, 160.

Additionally, the central controller may monitor the surrounding environment through the objects (A, B, C), and apply external stimulation to the experimental individuals through the objects, if necessary. The type of the stimulation may include any stimulation that affects the experimental individual.

In a specific example, the central controller may control/monitor a relationship between the experimental individual of the first probe module, the second probe module and the third probe module and the community (for example, collective bullying interpretation, empowerment, etc.).

In a specific example, the central controller may control/monitor a relationship between the probe modules and the objects in the experimental community or communication between the experimental communities.

In another example, according to the interpretation of the measurement outcome of the object, the brain stimulation signal may be applied to all the communities, and the experiment may be extended to brain stimulation to other individual/community using the experience (brain interpretation information) of specific individual/community.

Figure 4:
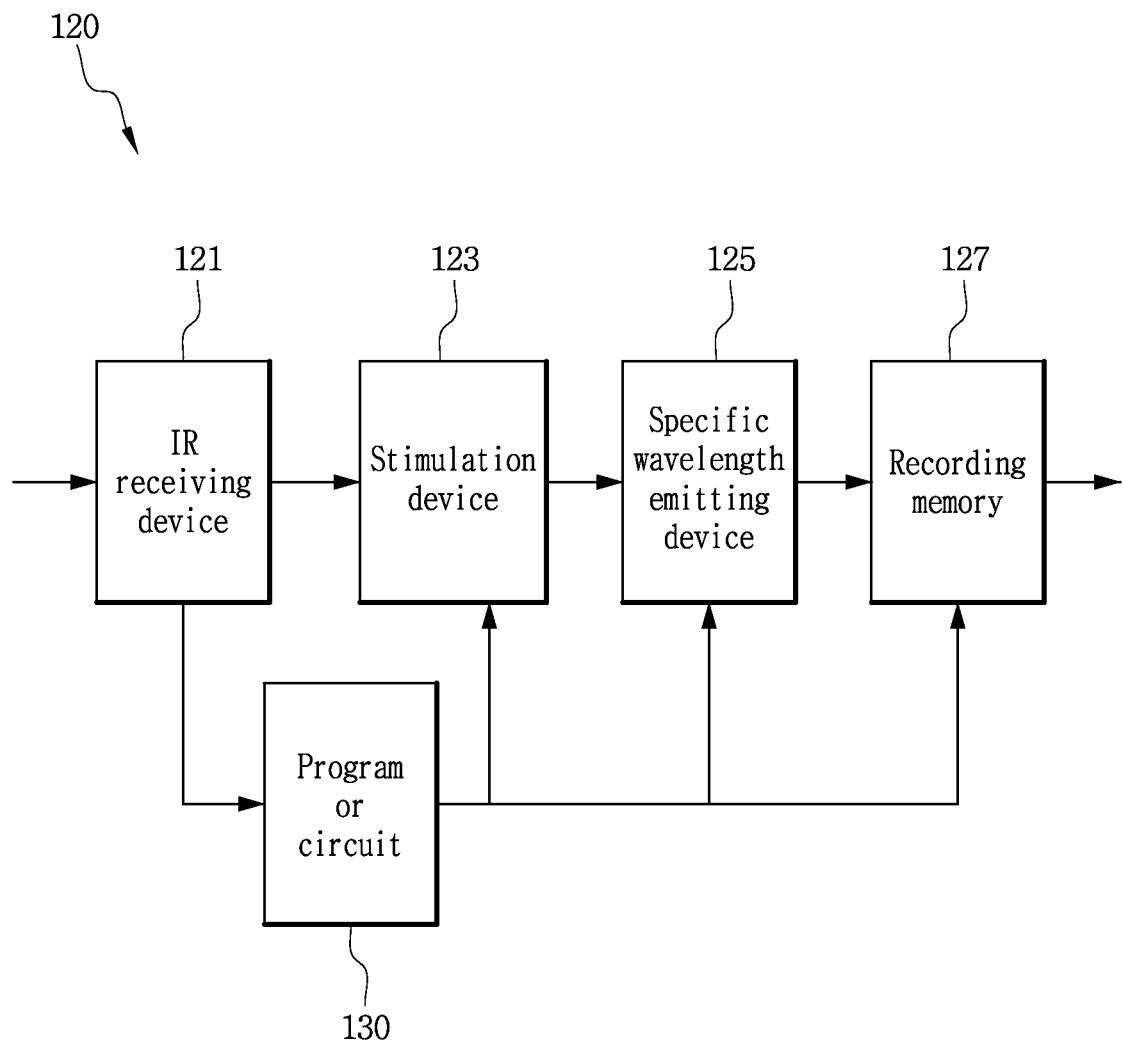
FIG. 4 is a block diagram of a probe module according to another embodiment of the present disclosure.
Figure 5:
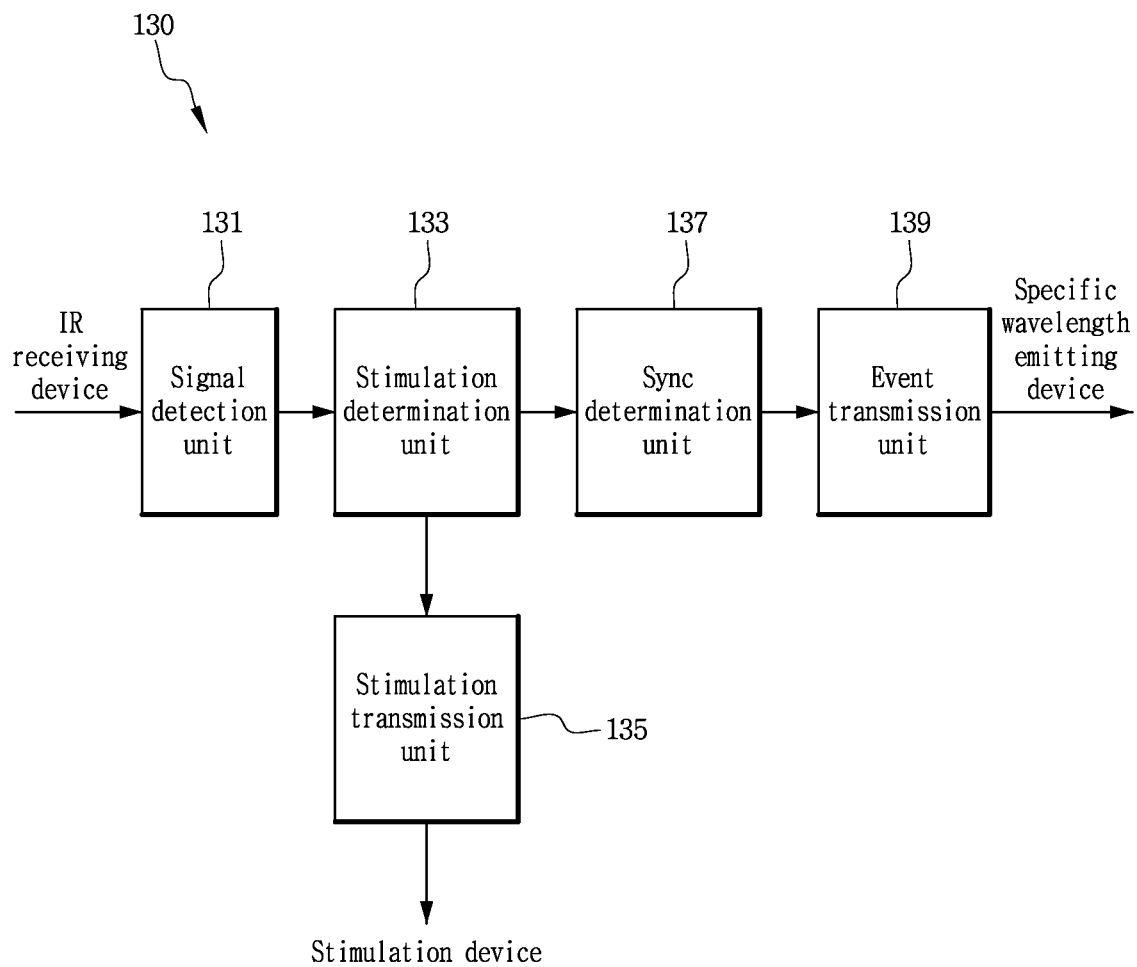
FIG. 5 shows a program or circuit of FIG. 4.

FIG. 4 is a block diagram of the probe module according to another embodiment of the present disclosure. FIG. 5 shows a program or circuit of FIG. 4.

The probe module 120 according to FIG. 4 is identical to the probe module 120 of FIG. 3 except that the probe module 120 of FIG. 4 further includes the program or circuit 130. Accordingly, the same element as the probe module 120 of FIG. 3 is given with the same reference sign, and the repeated description is omitted.

The program or circuit 130 included in the probe module 120 of FIG. 4 interprets the brain's electrical signal of the individual 2, stores the interpretation outcome of the brain's electrical signal and transmits it to the central controller.

To this end, referring to FIG. 5, the program or circuit 130 may include a signal detection unit 131, a stimulation determination unit 133, a stimulation transmission unit 135, a sync determination unit 137 and an event transmission unit 139.

The signal detection unit 131 may detect and process the brain's electrical signal received by the IR receiving device. The signal processing may be periodically performed, for example, every 0.1 sec.

The stimulation determination unit 133 may determine the presence or absence of a stimulation command from the processed brain's electrical signal, and when the stimulation command is present, transmit the stimulation command to the stimulation transmission unit 135. Accordingly, the stimulation transmission unit 135 may transmit the determined stimulation command and the time sync signal to the stimulation device.

The sync determination unit 137 may determine the presence or absence of the time sync signal from the processed brain's electrical signal, and the event transmission unit 139 may periodically store the brain's electrical signal related to a specific event in the recording memory or transmit it to the central controller through the specific wavelength emitting device.

Figure 6:
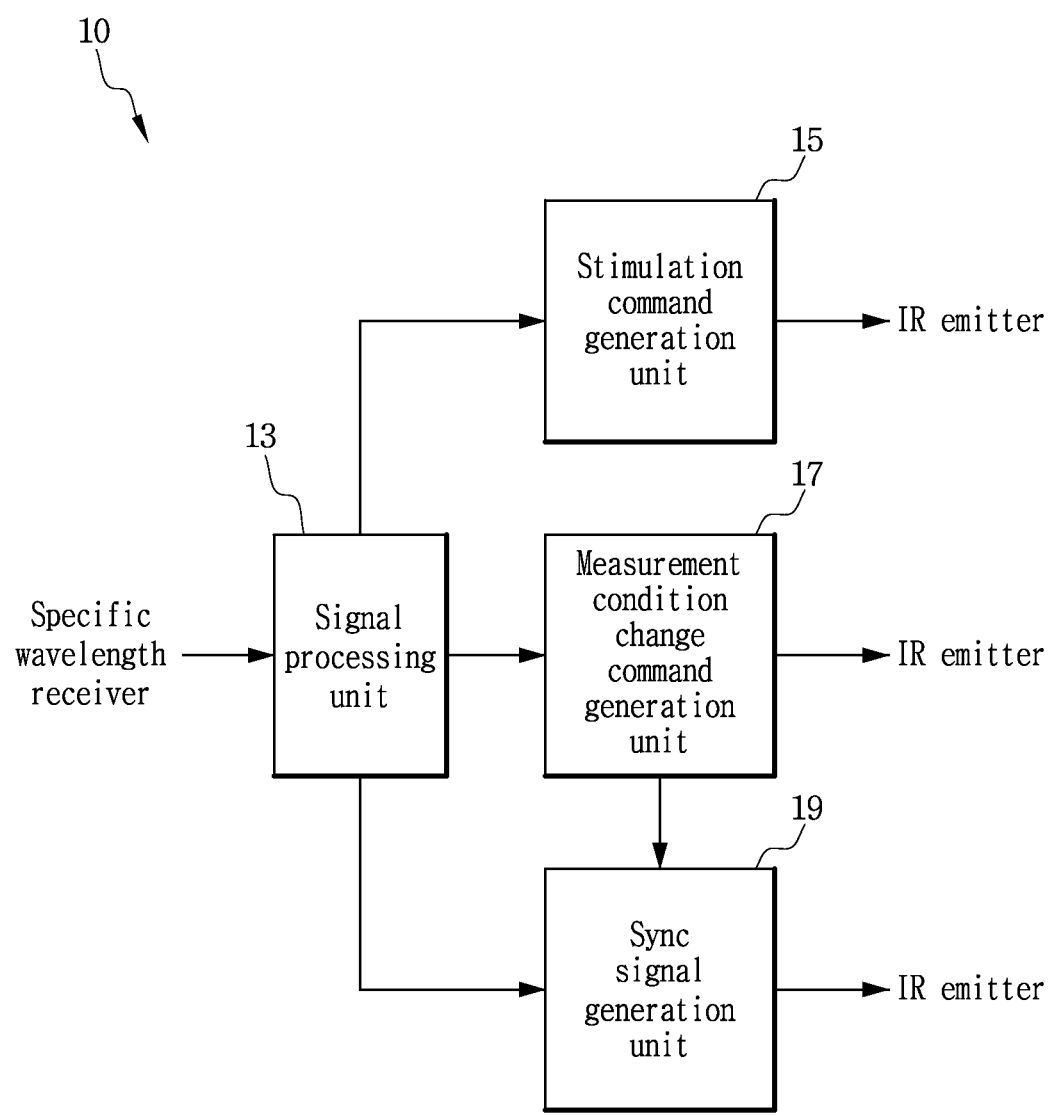
FIG. 6 is a block diagram of a central controller included in a device for monitoring brain-object interactions in a community according to an embodiment of the present disclosure.

FIG. 6 is a block diagram of the central controller included in the device for monitoring brain-object interactions in a community according to an embodiment of the present disclosure.

Referring to FIG. 6, the central controller may include a signal processing unit 13, a stimulation command generation unit 15, a measurement condition change command generation unit 17 and a sync signal generation unit 19.

The signal processing unit 13 may process the brain's electrical signal received from the probe module through the specific wavelength receiver 12. The stimulation command generation unit 15 may determine a stimulation command part from the processed brain's electrical signal, and generate, execute and transmit a stimulation command to the IR emitter 11.

The measurement condition change command generation unit 17 may determine a measurement condition change part from the processed brain's electrical signal, and generate, execute and transmit a measurement condition change command to the IR emitter 11.

The sync signal generation unit 19 may determine a time sync signal part from the processed brain's electrical signal, and generate, execute and transmit a sync signal to the IR emitter 11.

The central controller may control and store a relationship between the individual and the community by the environment or stimulation through the measured brain's electrical signal and the object. The probe module and the central controller perform optical communication, but in addition, may use wireless communication such as ultrasonic waves, Bluetooth, WiFi, NFC, WPAN and Zigbee.

As described above, the central controller may optically connect the respective probe modules and the respective objects, and regulate and integratedly control the connections between the probe modules and the objects (for example, surrounding environment, stimulation, etc.).

Figure 7:
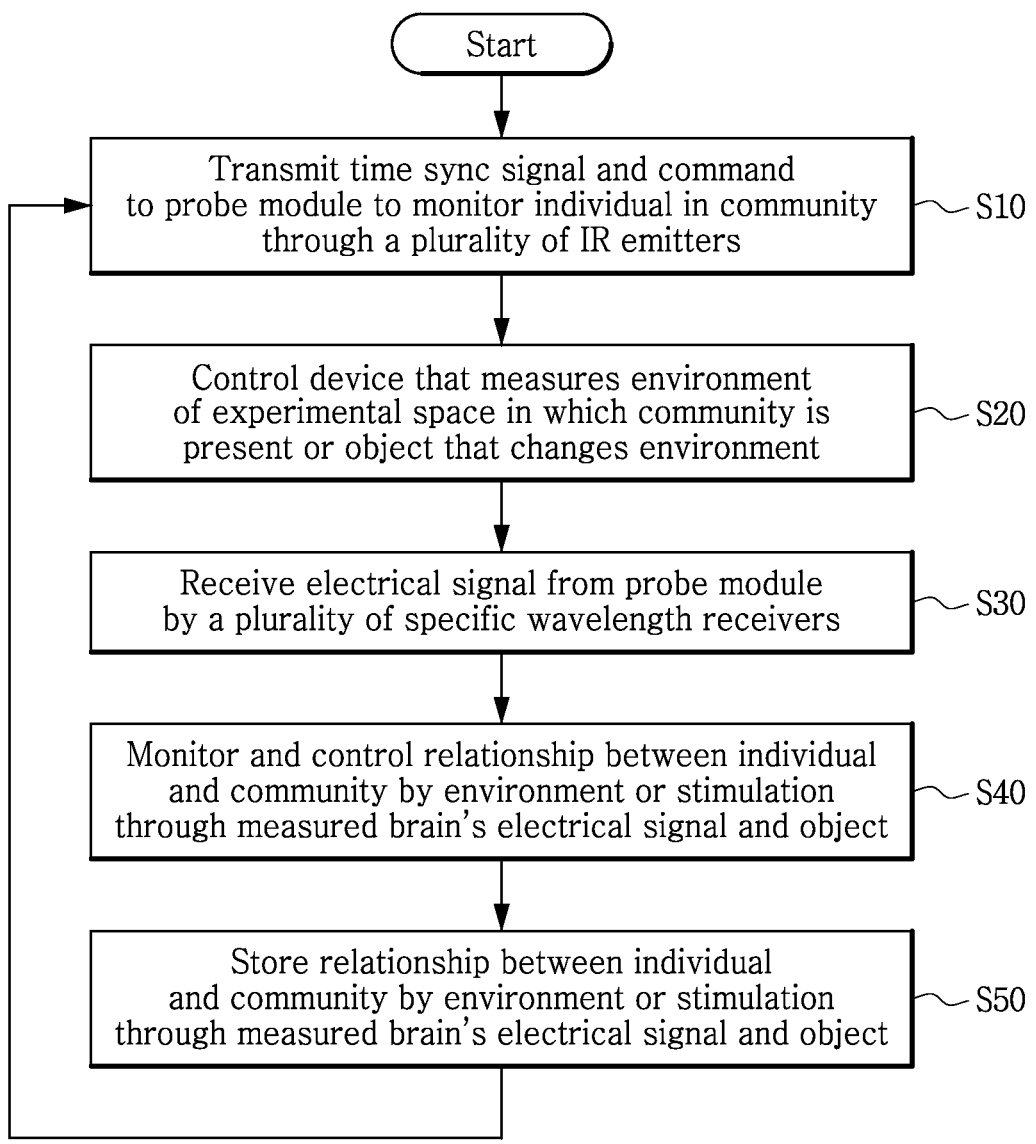
FIG. 7 is a flowchart of a method for monitoring brain-object interactions in a community according to an embodiment of the present disclosure.
Figure 8:
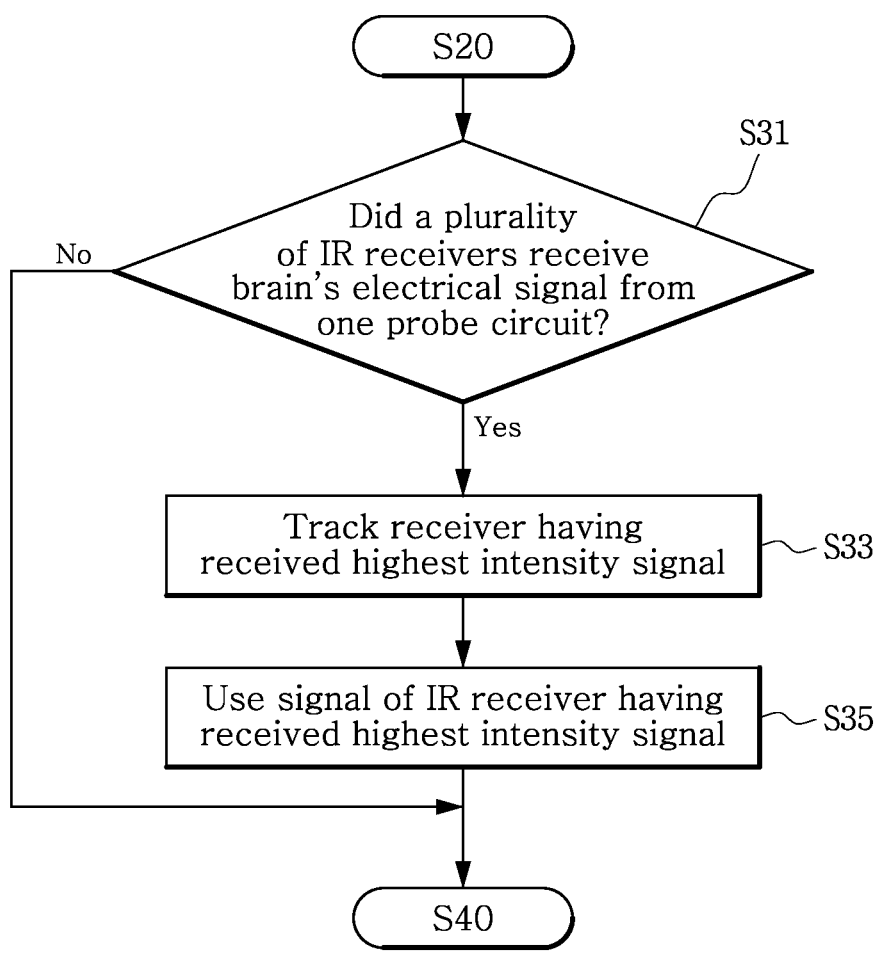
FIG. 8 is a flowchart of a case in which an electrical signal is received from a probe module by a plurality of specific wavelength receivers of FIG. 7.

FIG. 7 is a flowchart of a method for monitoring brain-object interactions in a community according to an embodiment of the present disclosure. FIG. 8 is a flowchart of a case in which the electrical signal is received from the probe module by the plurality of specific wavelength receivers of FIG. 7.

The method for monitoring brain-object interactions in a community according to this embodiment may be performed in substantially the same configuration as the device 10 of FIG. 1 and the central controller of FIG. 6.

Accordingly, the same element as the device 10 of FIG. 1 and the central controller of FIG. 6 is given with the same reference sign, and the repeated description is omitted.

Additionally, the method for monitoring brain-object interactions in a community according to this embodiment may be performed by the central controller included in the device of FIG. 6.

Referring to FIG. 7, the method for monitoring brain-object interactions in a community according to this embodiment includes transmitting the time sync signal and the command to the probe module to monitor the individual in the community through the plurality of IR emitters (step S10).

The device that measures the environment of the experimental space in which the community is present or the object that changes the environment is controlled (step S20), and the electrical signal is received from the probe module by the plurality of specific wavelength receivers (step S30).

The electrical signal received from the probe module may be the outcome of interpretation by the program or circuit that interprets the brain's electrical signal, embedded in the probe module.

Referring to FIG. 8, in step S30, in the case that the plurality of specific wavelength receivers receives the brain's electrical signal from one probe module (step S31), the specific wavelength receiver having received the highest intensity signal may be tracked (step S33), and only the highest intensity signal may be used (step S35).

The relationship between the individual and the community by the environment or stimulation may be monitored and controlled through the measured brain's electrical signal and the object (step S40). In addition, the relationship between the individual and the community by the environment or stimulation may be stored through the measured brain's electrical signal and the object (step S50). Additionally, the interpretation outcome may be displayed through the display device such as the monitor to allow the user to intuitively recognize it.

Figure 9:
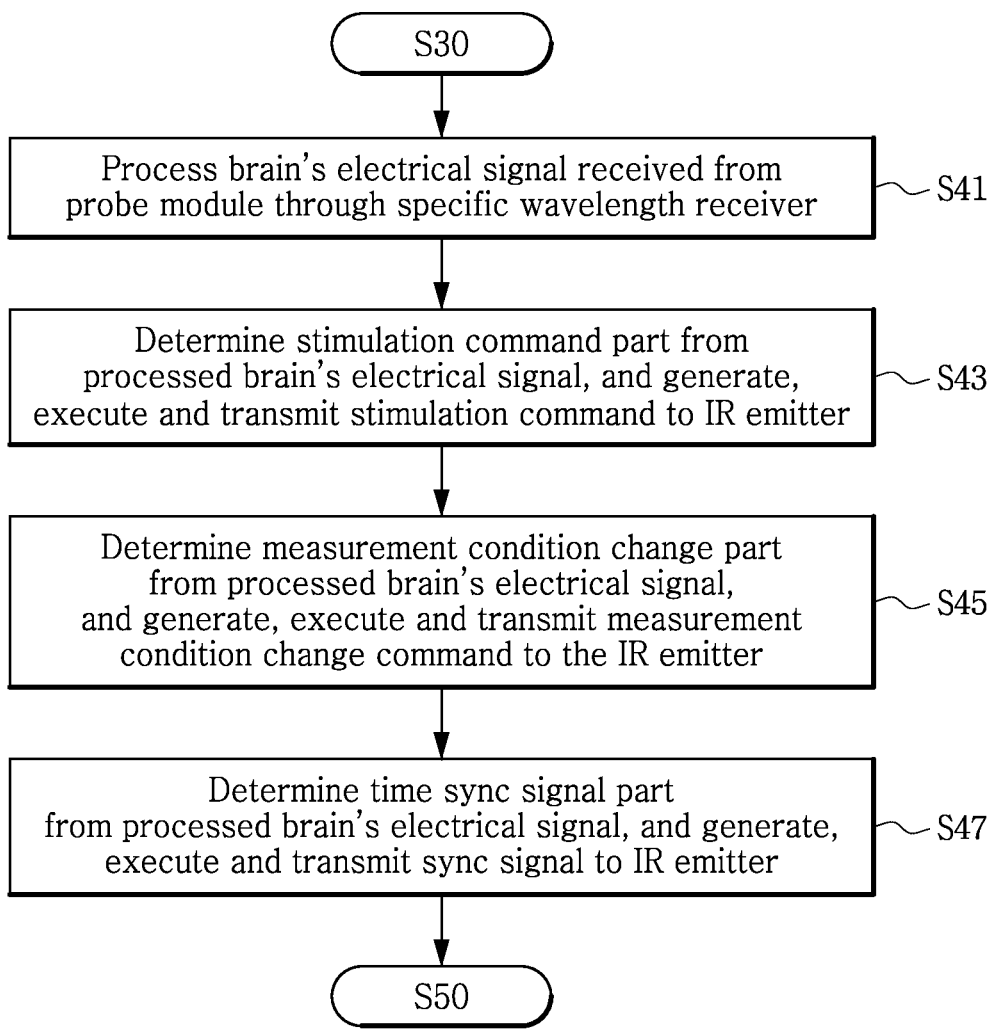
FIG. 9 is a detailed flowchart of a step of monitoring and controlling a relationship between an individual and a community of FIG. 7.

Referring to FIG. 9, in the step S40, the brain's electrical signal received from the probe module through the specific wavelength receiver may be processed (step S41). Subsequently, the stimulation command part from the processed brain's electrical signal may be determined, and when the stimulation command is necessary, the stimulation command may be generated, executed and transmitted to the IR emitter (step S43).

Additionally, the measurement condition change part from the processed brain's electrical signal may be determined, and when the measurement condition change is necessary, the measurement condition change command may be generated, executed and transmitted to the IR emitter (step S45).

The time sync signal part from the processed brain's electrical signal may be determined, and when the time sync signal is necessary, the sync signal may be generated, executed and transmitted to the IR emitter (step S47).

The present disclosure stores the electrical signal measured from each individual in the recording memory included or embedded in the probe module, and transmits only the outcome of interpretation using the program or circuit that interprets the brain's electrical signal to the central controller, thereby minimizing the monitoring signal to be transmitted.

The method for monitoring brain-object interactions in a community may be incorporated into applications the format f program instructions that may be executed through a variety of computer components and may be recorded in computer readable recording media. The computer readable recording media may include program instructions, data files and data structures alone or in combination.

The program instructions recorded in the computer readable recording media are specially designed and configured for the present disclosure and may be program instructions known and available to those having ordinary skill in the field of computer software.

Examples of the computer readable recording media include hardware devices specially designed to store and execute the program instructions, for example, magnetic media such as hard disk, floppy disk and magnetic tape, optical redia such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure have been hereinabove described with reference to the embodiments, those skilled in the art will understand that a variety of modifications and changes may be made thereto without departing from the spirit and scope of the present disclosure set forth in the appended claims.

The present disclosure may be useful in the study of the mechanism of collective intelligence, one of the phenomena attracting attention in the field of science in recent years. For example, the phenomena include collective decision, collective synchronization, panic escape, swarm behavior, collective action or the like, and until recently, such phenomena have been studied through the methodology of complex systems science in insects such as ants, bees or the like.

However, to bring it into the understanding of human society, it is necessary to conduct research through a variety of genetic or medication-induced variants in the mammalian brain, and the present technology may provide a tool for the combined research of brain science and sociology.

What is claimed is:

1. A device for monitoring brain-object interactions in a community, comprising:
 a probe module configured to be attached to each individual in the community, and including a stimulation device to stimulate the individual, a specific wavelength emitting device, an infrared (IR) receiving device and a recording memory to store a brain's electrical signal measured from the individual;
 a central controller to regulate a connection between the probe module and at least one object to control and monitor the probe module or the object, wherein the object monitors a surrounding environment of the community and applies external stimulation to the individual;
 a plurality of IR emitters to transmit a time sync signal and a command to the probe module to monitor the individual in the community, the IR emitters being controlled by the central controller; and
 a plurality of specific wavelength receivers to transmit the electrical signal received by the probe module to the central controller, the specific wavelength receivers being controlled by the central controller,
 wherein the central controller is configured to monitor brain-object interactions in the community by:
 (i) transmitting the time sync signal and the command to the probe module through the plurality of IR emitters,
 (ii) receiving the brain's electrical signal from the probe module through the plurality of specific wavelength receivers, and
 (iii) monitoring and controlling a relationship between the individual and the community by the environment or stimulation through the measured brain's electrical signal and the at least one object, and storing the relationship.

2. The device for monitoring brain-object interactions in a community according to claim 1, wherein the probe module further includes a program or circuit to interpret the brain's electrical signal, and store and transmit an interpretation outcome of the brain's electrical signal to the central controller.

3. The device for monitoring brain-object interactions in a community according to claim 2, wherein the program or circuit includes:
 a signal detection unit to detect and process the brain's electrical signal received by the IR receiving device;
 a stimulation determination unit to determine a presence or absence of a stimulation command from the processed brain's electrical signal;
 a sync determination unit to determine a presence or absence of a time sync signal from the processed brain's electrical signal;
 a stimulation transmission unit to transmit the determined stimulation command and the determined time sync signal to the stimulation device; and
 an event transmission unit to periodically store the brain's electrical signal related to a specific event in the recording memory, or transmit it to the central controller through the specific wavelength emitting device.

4. The device for monitoring brain-object interactions in a community according to claim 1, wherein the central controller includes:
 a signal processing unit to process the brain's electrical signal received from the probe module through the specific wavelength receiver;
 a stimulation command generation unit to determine a stimulation command part from the processed brain's electrical signal, and generate, execute and transmit the stimulation command to the IR emitters;
 a measurement condition change command generation unit to determine a measurement condition change part from the processed brain's electrical signal, and generate, execute and transmit a measurement condition change command to the IR emitters; and
 a sync signal generation unit to determine a time sync signal part from the processed brain's electrical signal, and generate, execute and transmit a sync signal to the IR emitters.

5. The device for monitoring brain-object interactions in a community according to claim 1, wherein the central controller controls and stores a relationship between the individual and the community by the environment or stimulation through the measured brain's electrical signal and the object.

6. The device for monitoring brain-object interactions in a community according to claim 1, wherein in a case in which the plurality of specific wavelength receivers receives the brain's electrical signal from one probe module, the central controller uses the signal of the specific wavelength receiver having received a highest intensity signal.

7. The device for monitoring brain-object interactions in a community according to claim 1, wherein the stimulation device includes at least one of an electrical stimulation device, an optical stimulation device or a chemical stimulation device.

8. The device for monitoring brain-object interactions in a community according to claim 1, wherein the probe module commands the stimulation device to apply direct or autonomous stimulation according to the command from the central controller.

9. The device for monitoring brain-object interactions in a community according to claim 1, wherein the object is a device that measures an environment of an experimental space in which the community is present or a device that changes the environment.

10. The device for monitoring brain-object interactions in a community according to claim 1, wherein each probe module is allocated with a unique ID or address to communicate with the central controller.

11. The device for monitoring brain-object interactions in a community according to claim 1, wherein the probe module and the central controller further use at least one wireless communication of ultrasonic waves, Bluetooth, WiFi, NFC, WPAN or Zigbee.

12. A method for monitoring brain-object interactions in a community, by a probe module configured to be attached to each individual in the community, and including a stimulation device to stimulate the individual, a specific wavelength emitting device, an infrared (IR) receiving device and a recording memory to store a brain's electrical signal measured from the individual and a central controller to regulate a connection between the probe module and at least one object to control and monitor the probe module or the object, wherein the object monitors a surrounding environment of the community and applies external stimulation to the individual, the method comprising:
 transmitting a time sync signal and a command to the probe module to monitor the individual in the community through a plurality of IR emitters;
 controlling a device that measures an environment of an experimental space in which the community is present or the object that changes the environment;
 receiving the electrical signal from the probe module by a plurality of specific wavelength receivers; and monitoring and controlling a relationship between the individual and the community by the environment or stimulation through the measured brain's electrical signal and the object.

13. The method for monitoring brain-object interactions in a community according to claim 12, wherein the electrical signal received from the probe module is an outcome of interpretation by a program or circuit to interpret the brain's electrical signal, embedded in the probe module.

14. The method for monitoring brain-object interactions in a community according to claim 12, wherein the monitoring and controlling of the relationship between the individual and the community by the environment or stimulation through the measured brain's electrical signal and the object comprises:

processing the brain's electrical signal received from the probe module through the specific wavelength receivers;

determining a stimulation command part from the processed brain's electrical signal, and generating, executing and transmitting a stimulation command to the IR emitters;

determining a measurement condition change part from the processed brain's electrical signal, and generating, executing and transmitting a measurement condition change command to the IR emitters; and determining a time sync signal part from the processed brain's electrical signal, and generating, executing and transmitting a sync signal to the IR emitters.

15. The method for monitoring brain-object interactions in a community according to claim 12, further comprising:

storing the relationship between the individual and the community by the environment or stimulation through the measured brain's electrical signal and the object.

16. The method for monitoring brain-object interactions in a community according to claim 12, wherein the receiving of the electrical signal from the probe module comprises using the signal of the specific wavelength receiver having received a highest intensity signal, in a case in which the plurality of specific wavelength receivers receives the brain's electrical signal from one probe module.

17. A computer-readable storage medium having recorded thereon a computer program for performing the method for monitoring brain-object interactions in a community according to claim 12.

* * * * *